US010899967B2

(12) United States Patent
Tanfoglio

(10) Patent No.: US 10,899,967 B2
(45) Date of Patent: Jan. 26, 2021

(54) MOLECULAR PYRODISAGGREGATOR

(71) Applicant: Domenico Tanfoglio, Isorella (IT)

(72) Inventor: Domenico Tanfoglio, Isorella (IT)

( * ) Notice: Subject to any disclaimer, the term of this patent is extended or adjusted under 35 U.S.C. 154(b) by 0 days.

(21) Appl. No.: 15/141,974

(22) Filed: Apr. 29, 2016

(65) Prior Publication Data

US 2016/0319196 A1     Nov. 3, 2016

(30) Foreign Application Priority Data

Jul. 10, 2015    (IT) ........................ 102015000032708

(51) Int. Cl.
     *C10B 47/44*       (2006.01)
     *F27B 9/18*        (2006.01)
     (Continued)

(52) U.S. Cl.
     CPC .............. *C10B 47/44* (2013.01); *C10B 53/00* (2013.01); *C10B 53/02* (2013.01); *C10B 53/07* (2013.01);
     (Continued)

(58) Field of Classification Search
     CPC .............. C10G 1/06; C10G 2300/1003; C10G 2300/1014; C10B 53/00; C10B 53/02;
     (Continued)

(56) References Cited

U.S. PATENT DOCUMENTS 1,467,509 A   *   9/1923   Skinner ..................... C01B 7/03
                                                                                                                     422/204
2,225,199 A   *   12/1940   Abbott ..................... C04B 2/10
                                                                                                                     432/132
(Continued)

FOREIGN PATENT DOCUMENTS

AU        2002245146      12/2007
AU        2015203118 A1   7/2015
(Continued)

OTHER PUBLICATIONS

DE2922041A1_ENG (Espacenet machine translation of Thomanetz, accessed Nov. 17, 2018) (Year: 1980).*

(Continued)

*Primary Examiner* — Jonathan Miller
*Assistant Examiner* — Gabriel E Gitman
(74) *Attorney, Agent, or Firm* — 24IP Law Group USA, PLLC; Timothy R DeWitt

(57) ABSTRACT

A molecular pyrodisaggregation system having a loading column for loading materials to be disaggregated into the pyrodisaggregator, a thermal propeller for generating hot fumes to circulate in the pyrodisaggregator, and a condenser connected to an exit from the pyrodisaggregator for cooling gases from the pyrodisaggregator. The pyrodisaggregator has a furnace having a furnace wall defining a chamber within the furnace, a fuser tube within the furnace chamber, a channel within the furnace chamber between the fuser tube and the furnace wall, an Archimedes screw within the fuser tube for moving material to be disaggregated through the furnace, a first exit for inert materials from the fuser tube, a second exit for gases from the fuser tube, and a third exit for fumes circulating through the channel in the furnace.

15 Claims, 7 Drawing Sheets

(51) Int. Cl.
  *C10B 53/07* (2006.01)
  *C10B 53/00* (2006.01)
  *C10K 1/02* (2006.01)
  *C10B 53/02* (2006.01)
  *C10J 3/30* (2006.01)
  *C10J 3/00* (2006.01)
  *C10G 1/06* (2006.01)

(52) U.S. Cl.
  CPC ............. *C10J 3/007* (2013.01); *C10J 3/30* (2013.01); *C10K 1/02* (2013.01); *C10G 1/06* (2013.01); *C10G 2300/1003* (2013.01); *C10G 2300/1014* (2013.01); *C10J 2200/158* (2013.01); *C10J 2300/1884* (2013.01); *F23K 2203/201* (2013.01); *F23K 2203/203* (2013.01); *F27B 9/18* (2013.01); *F27B 9/185* (2013.01); *Y02E 50/10* (2013.01); *Y02P 20/143* (2015.11); *Y02P 30/20* (2015.11)

(58) Field of Classification Search
  CPC . C10B 53/07; C10B 47/44; C10K 1/02; C10J 3/007; C10J 3/30; C10J 2200/158; C10J 2300/1884; F23K 2203/201; F23K 2203/203; Y02P 20/143; Y02P 30/20; Y02E 50/14; F27B 9/18; F27B 9/185
  See application file for complete search history.

(56) References Cited

U.S. PATENT DOCUMENTS

| | | | |
|---|---|---|---|
| 2,475,639 A * | 7/1949 | Rainwater | B01D 1/16 202/191 |
| 2,525,973 A | 10/1950 | Carl et al. | |
| 3,232,341 A * | 2/1966 | Woodworth | F28B 1/00 165/109.1 |
| 3,470,068 A * | 9/1969 | Kemmerer | C10B 49/04 201/33 |
| 3,625,778 A | 12/1971 | Hildreth et al. | |
| 3,881,431 A * | 5/1975 | DiSabatino | F23G 5/18 110/255 |
| 3,958,920 A * | 5/1976 | Anderson | F27B 9/185 432/23 |
| 4,009,263 A | 2/1977 | Shafer | |
| 4,027,602 A * | 6/1977 | Mott | F23C 99/005 110/203 |
| 4,030,877 A * | 6/1977 | Robinson | C03B 5/237 432/29 |
| 4,095,426 A * | 6/1978 | Rhodes | F01K 25/02 464/29 |
| 4,098,649 A | 7/1978 | Redker | |
| 4,182,246 A * | 1/1980 | Lombana | F23G 5/165 110/188 |
| 4,247,367 A * | 1/1981 | Reilly | C10B 47/44 201/16 |
| 4,248,604 A * | 2/1981 | Woldy | C10J 3/08 122/7 R |
| 4,385,567 A * | 5/1983 | Voss | F23B 1/18 110/101 CD |
| 4,516,302 A | 5/1985 | Chulada et al. | |
| 4,820,382 A * | 4/1989 | Cobb | C10B 7/00 201/32 |
| 4,838,183 A * | 6/1989 | Tsaveras | F23G 5/002 110/101 C |
| 4,838,341 A | 6/1989 | Bye et al. | |
| 5,035,730 A * | 7/1991 | Kisaragi | B01D 5/0015 55/434.4 |
| 5,376,458 A | 12/1994 | Natesan | |
| 5,451,297 A * | 9/1995 | Roy | C10B 53/00 201/21 |
| 5,747,561 A | 5/1998 | Smirnov et al. | |
| 6,212,891 B1 | 4/2001 | Minta et al. | |
| 6,248,399 B1 | 6/2001 | Hehmann | |
| 6,537,388 B1 | 3/2003 | Wynns et al. | |
| 6,634,781 B2 | 10/2003 | Bowens | |
| 6,832,564 B2 * | 12/2004 | Hutmacher | F27B 9/185 110/208 |
| 6,863,878 B2 | 3/2005 | Klepper | |
| 7,083,663 B2 | 8/2006 | Shih et al. | |
| 7,644,804 B2 * | 1/2010 | Harman | F01N 1/12 137/810 |
| 7,677,843 B2 | 3/2010 | Techel | |
| 7,732,059 B2 | 6/2010 | Ren et al. | |
| 7,790,316 B2 | 9/2010 | Aramata et al. | |
| 8,231,705 B2 | 7/2012 | Uibel | |
| 8,304,590 B2 * | 11/2012 | Hopkins | C10L 5/44 585/240 |
| 8,308,912 B2 | 11/2012 | Hustache et al. | |
| 8,470,097 B2 | 6/2013 | Chun et al. | |
| 8,501,668 B2 | 8/2013 | McGrath | |
| 8,715,855 B2 | 5/2014 | Kawakami et al. | |
| 9,112,224 B2 | 8/2015 | Yamazaki | |
| 2002/0129752 A1 * | 9/2002 | Khinkis | F23L 1/02 110/345 |
| 2003/0118855 A1 | 6/2003 | Santella | |
| 2004/0108251 A1 * | 6/2004 | Gust | C10B 49/22 208/126 |
| 2009/0117014 A1 | 5/2009 | Carpenter | |
| 2011/0059335 A1 | 3/2011 | Hernblom | |
| 2012/0012293 A1 | 1/2012 | Doty | |
| 2012/0073199 A1 * | 3/2012 | Lewis | C10B 53/02 48/127.5 |
| 2012/0073949 A1 * | 3/2012 | Flottvik | C10B 47/44 202/118 |
| 2012/0237693 A1 | 9/2012 | Jackson | |
| 2013/0212930 A1 * | 8/2013 | Naae | C10B 53/02 44/307 |
| 2013/0240343 A1 | 9/2013 | Wolf | |
| 2014/0259895 A1 | 9/2014 | Mason | |

FOREIGN PATENT DOCUMENTS

| | | | | |
|---|---|---|---|---|
| BR | PI0807997 A2 | 4/2010 | | |
| CA | 2731803 A1 | 1/2009 | | |
| DE | 2922041 A1 * | 12/1980 | | C10B 47/44 |
| EP | 00663612 B2 | 10/1990 | | |
| FR | 2974858 A1 | 11/2012 | | |
| GB | 176025 | * | 3/1922 | |
| GB | 368291 A | 2/1932 | | |
| WO | 9107361 | 3/1991 | | |
| WO | 96/09357 A1 | 3/1996 | | |
| WO | 2007136148 A1 | 11/2007 | | |
| WO | 2011075836 A1 | 6/2011 | | |

OTHER PUBLICATIONS

"Flex-Auger" www.roxell.com, http://www.roxell.com/en/systems/Transport/Pigs/Flex-Auger/.

"Grow-Flex™ Poultry Feed Line Auger" www.hogslat.com, http://www.hogslat.com/grower-select-poultry-feedline-auger-model-44.

Maatta, Jenni. "Modifications of surface materials and their effects on cleanability as studied by radiochemical methods." (2007), https://helda.helsinki.fi/handle/10138/20763.

* cited by examiner

MOLECULAR PYRODISAGGREGATOR

CROSS-REFERENCE TO RELATED APPLICATIONS

The present application is related to and claims priority to Italian Patent Application No. 2015A000072 filed on Apr. 30, 2015, Italian Patent Application Nos. 102015000030378 and 102015000030411 filed on Jul. 3, 3015, Italian Patent Application Nos. 102015000032708 and 102015000002727 filed on Jul. 10, 2015, and Italian Patent Application Nos. 102015000062176, 102015000062144, 102015000062136, 102015000062165 and 102015000062154 filed on Oct. 15, 2015.

The aforementioned patent applications are hereby incorporated by referenced in their entirety.

STATEMENT REGARDING FEDERALLY SPONSORED RESEARCH OR DEVELOPMENT

None.

BACKGROUND

Field of the Invention

The present invention relates to systems and methods of pyrodisaggregation.

Brief Description of the Related Art

A plasma waste converter basically is a plasma torch applied to garbage. A plasma torch uses a gas and powerful electrodes to create an ionized gas or plasma, i.e., a gas with free-roaming electrons that carries a current and generates a magnetic field. At these very high temperatures, molecules break down in a process that may be referred to as molecular dissociation. When molecules are exposed to intense energy (like the heat generated by a plasma torch), the molecular bonds holding them together become excited and break apart into their elemental components.

Organic, or carbon-based, molecules become volatized, or turn into gases referred to as synthetic gas or syngas, which can be used as a fuel source. Inorganic compounds melt down and become vitrified, or converted, into a hard, glassy substance similar in appearance and weight to obsidian. Metals melt down as well, combining with the rest of the inorganic matter (also referred to as "slag").

Unlike incinerators, which use combustion to break down garbage, there is no burning or oxidation in this process. Plasma torches can operate in airtight vessels. Combustion requires oxidization; pyrolysis does not. The heat, for example 500° C. to 1100° C., from plasma converters causes pyrolysis, which is a process in which organic matter is broken down into non-condensable gases ($CO$, $H_2$, $CO_2$), non-condensable hydrocarbons ($CH_4$, $C_2H_6$, $C_3H_8$, $C_4H_{10}$), heavy hydrocarbons, tars condensable in oils, water ($H_2O$) and coke (carbon). Generally, in past systems, if the reaction is conducted at low temperatures (400-500° C.) with a long residence time (several tens of minutes), coke will be the majority product, while if the reaction is conducted at high temperatures (700-1000° C.), the majority product will be combustible gas.

One method for achieving pyrolysis is to heat an organic material in a furnace by means of a double envelope in which combustion gases from a burner circulate. Since the heat is exchanged only by the walls, the method requires large surfaces and a large volume. It is useful for slow reactions conducted at low temperatures (400 to 500° C.), but the temperatures and the mixing are not under good control and production cannot be switched from gas or oil production by user choice. Another conventional method is direct heating of the material by hot gases released by a flame. Since the combustion in this method is in the same enclosure as the pyrolysis reaction a large oxygen supply is needed, which harms the quality of the waste gases. Accordingly, additional methods and systems may be desired.

Another method is disclosed in International Patent Application Nos. WO2005/018841 and WO 2006/087310. The disclosed method uses steel beads heated outside the furnace and then passed through an airlock system into the furnace where they are mixed with organic material in a horizontal or slightly sloping furnace. The system controls the residence time by controlling the furnace rotational speed and controls the temperature by controlling the temperature of the beads. This system and method suffers from shortcomings in that is does not sufficiently crack the condensable gases and tars because from the time they are produced to the time they are extracted the condensable gases are not in contact with the beads. Another drawback is that the beads tend to clump together.

U.S. Pat. No. 8,308,912 disclosed another system and method in which high temperature stainless steel toroids are mixed with organic material in a small vertical furnace. The stainless steel toroids may be an alloy containing nickel and cobalt, which may improve the gasification catalytically.

Plasma waste converters can treat almost any kind of waste, including some traditionally difficult waste materials. It can treat medical waste or chemically-contaminated waste and leave nothing but gases and slag. Because it breaks down these dangerous wastes into their basic elements, they can be disposed of safely.

Pyrolysis of waste rubber in thermal plasma has been studied for the purpose of producing gaseous fuel and recovering carbon black filler. For example, in Huang, H.; Lan Tang; C. Z. Wu "Characterization of Gaseous and Solid Product from Thermal Plasma Pyrolysis of Waste Rubber," *Environmental Science & Technology* 37 (19): 4463-4467 (2003), disclosed a plasma reactor having a dc arc nitrogen plasma generator with a maximum electric power input of 62.5 kVA and a reaction chamber of 50 mm inner diameter and 1000 mm height. The results of a series of experiments reportedly showed that the main components of the gaseous product were $H_2$, $CO$, $C_2H_2$, $CH_4$, and $C_2H_4$; the heat value of the gas is about 5-9 $MJ/Nm^3$. The solid product reportedly contained more than 80 wt % elemental carbon, had a surface area of about 65 $m^2/g$, and was referred to as pyrolytic carbon black ($CB_p$). X-ray photoelectron spectroscopy (XPS) analysis reportedly revealed that the $CB_p$ has mainly graphitic carbon structure similar to those of commercial carbon black. The $CB_p$ may be used as semi-reinforcing carbon black in non-tire rubber applications, or, after upgrading, as carbon black filler for tire.

SUMMARY

In an embodiment, a system comprises of a pyrodisaggregator, a loading column, a thermal propeller, and a condenser. The pyrodisaggregator is comprised of a furnace having a chamber within it, a fuser tube within the furnace chamber, an Archimedes screw within the fuser tube for moving material to be disaggregated through the fuser tube, a first furnace exit for inert materials from the fuser tube, a second furnace exit for gases from the fuser tube and a third furnace exit for fumes circulating through the furnace chamber. The fuser tube may be substantially horizontal within the furnace chamber, although other orientations may also be used. The fuser tube is connected to the first exit and the second exit.

A loading column may be connected to the pyrodisaggregator for loading materials to be disaggregated into the fuser tube in the furnace. A source of hot fumes produced by combustion is connected to the furnace, wherein hot fumes from the source circulate in the chamber is the furnace around the fuser tube. The source of hot fumes may be a thermal propeller. The system further may comprise a condenser connected to the second exit.

The condenser may have an entry dome or other structure connected to the second exit from the furnace for receiving gases from the pyrodisaggregator, a cold water chamber surrounding the entrance dome for cooling the gases received from the pyrodisaggregator, a primary hopper connected to the entrance dome for collecting oil condensed out of the gases received from the pyrodisaggregator, first and second vertical condenser columns for proving a cooled path for gas flowing into the condenser column, each condenser column having a channel through which gases flow and an air lock space for water used to cool gases within the channel, a connection manifold connecting the first condenser column to the second condenser column, wherein gas from the entry dome flows into and through the first condenser column then through the connection manifold and then through the second condenser column, a secondary hopper connected to the second condenser column for receiving light hydrocarbons from the second condenser column, and an aspirator for moving Syngas from the condenser into a storage tank. The condenser further may include a plurality of spirals within the channel in at least one of the first and second condenser columns for slowing a flow of gases within the condenser column.

The thermal propeller may comprise a combustion and pyrolysis chamber formed by at least one side wall, a primary fuser slab and a secondary fuser slab forming a bottom of the combustion and pyrolysis chamber, the primary fuser slab positioned to receive solid fuel from a fuel tank and the secondary fuser slab positioned to receive solid fuel from the primary fuser slab and a lid for closing the combustion and pyrolysis chamber. The thermal propeller further may have a first agitator for moving solid fuel on the primary fuser slab and a second agitator for moving solid fuel on the secondary fuser slab. Still further, the thermal propeller may have a stoichiometric air carburetor connected to the combustion and pyrolysis chamber. The stoichiometric air carburetor may have one or more exits into the combustion and pyrolysis chamber in an upper portion of the combustion and pyrolysis chamber. The thermal propeller further may have a turbine driven fan connected to the stoichiometric air carburetor. The thermal propeller may further comprise a first lower chamber beneath the primary fuser slab, wherein a plurality of air holes extend through the primary fuser slab wherein the stoichiometric air carburetor is connected to the first lower chamber. The thermal propeller further may have an ash downloading exit. The thermal propeller further may have a second lower chamber beneath the secondary fuser slab, wherein a plurality of air holes extend through the secondary fuser slab, wherein the second lower chamber is connected to the first lower chamber.

In another embodiment, a molecular pyrodisaggregation system includes a plurality of fuser tubes. The system has a pyrodisaggregator, having a furnace, the furnace having a furnace wall defining a chamber within the furnace, a plurality of fuser tubes within the furnace chamber, a channel within the furnace chamber surrounding the plurality of fuser tubes, an Archimedes screw within each the fuser tubes for moving material to be disaggregated through the fuser tube, a first exit from each fuser tube for inert materials from the fuser tube, a second exit from each fuser tube for gases from the fuser tube, and a third exit from fumes circulating through the channel in the furnace. A loader is connected to the pyrodisaggregator for loading materials to be disaggregated into the plurality of fuser tubes in the furnace. A source of hot fumes is connected to the furnace, wherein hot fumes from the heat source circulate in the channel in the furnace around the fuser tubes. A condenser connected to the second exit.

The condenser has an entrance dome connected to the second exit from the furnace for receiving gases from the pyrodisaggregator, a cold water chamber surrounding the entrance dome for cooling the gases received from the pyrodisaggregator. First and second condenser columns each for proving a cooled path for gas flowing into the condenser columns. Each condenser column has a plurality of spirals within the each condenser column for slowing a flow of gas within the condenser column, an air lock space within each the condenser columns for circulating water used to cool gas. Those skilled in the art understand that while a preferred embodiment uses spirals, cochlea or other forms of batting could be used in the condenser. A connection manifold connects the first condenser column to the second condenser column, wherein gas from the entry dome flows into and through the first condenser column then through the connection manifold and then through the second condenser column, a primary hopper connected to the entrance dome and the first condenser column for collecting oil condensed out of the gases received from the pyrodisaggregator, a secondary hopper connected to the second condenser column for receiving light hydrocarbons from the second condenser column. The condenser further has an aspirator for moving Syngas from the condenser into a storage tank.

Still other aspects, features, and advantages of the present disclosure are readily apparent from the following detailed description, simply by illustrating example embodiments and implementations. Embodiments of the disclosure are also capable of other and different embodiments and its several details can be modified in various obvious respects, all without departing from the spirit and scope of the present disclosure. Accordingly, the drawings and descriptions are to be regarded as illustrative in nature, and not as restrictive. Additional objects and advantages of the disclosure will be set forth in part in the description which follows and in part will be obvious from the description, or may be learned by practice of the disclosure.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
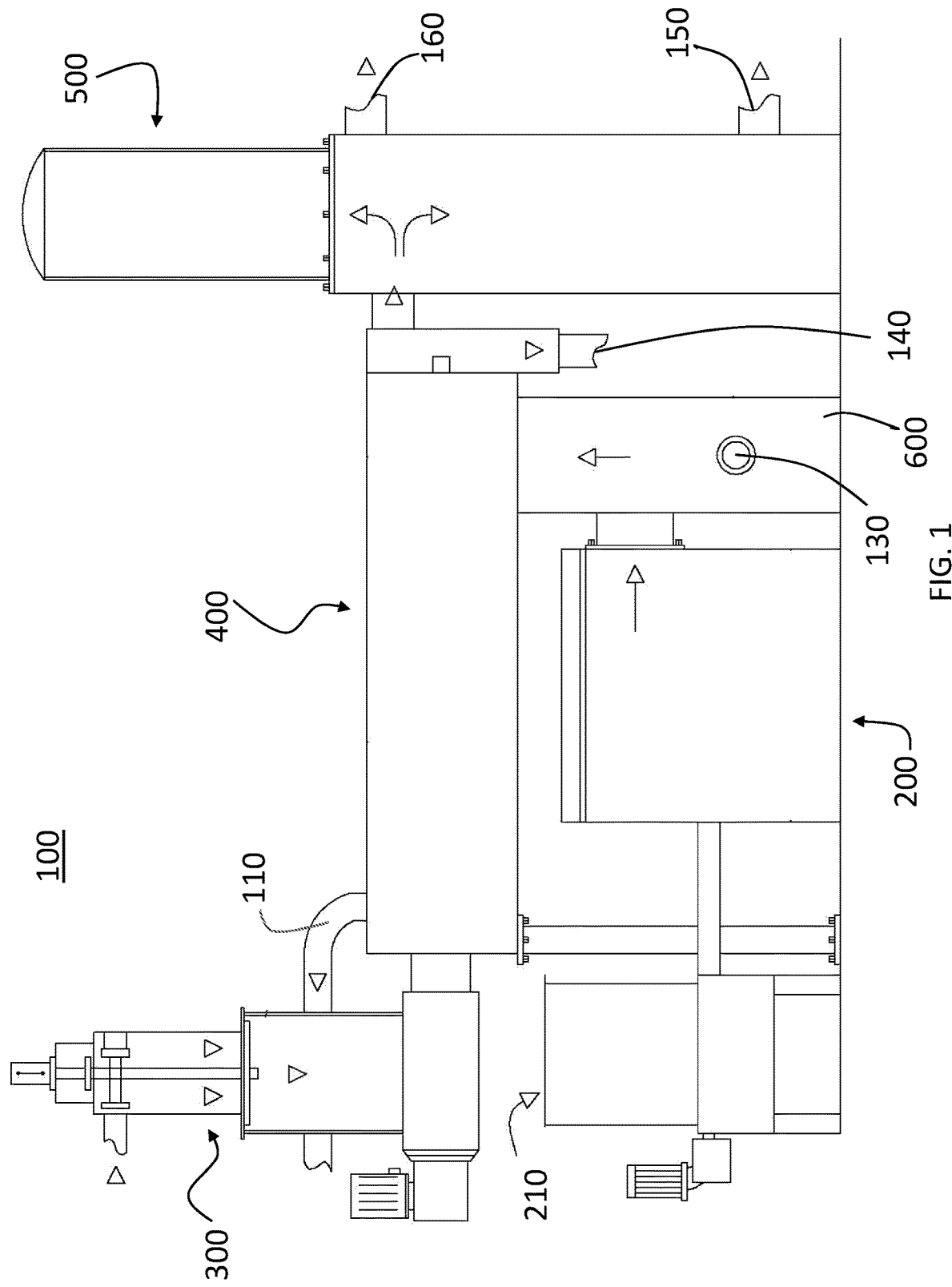
FIG. 1 is a diagram of an example system for molecular pyrodisaggregation.

An example embodiment of a system of the present disclosure is described generally with reference to FIG. 1. The molecular pyrodisaggregation system 100 has a heat source or thermal propeller 200, a loading column 300, a disaggregator 400, a condenser 500 and a catalyst ion junction cube 600. Organic material to be disaggregated is loaded into the system via loading column 300. In the loading column 300, which is described in more detail below with reference to FIG. 3, air is removed from the organic material. From the loading column 300, the organic material, now void of air, is inserted into fuser tubes or pipes in the disaggregator 400 by an Archimedes screw. A valve in the loading column controls the passage of the organic material and air during the loading process, such that it will close when organic material is being loaded into the loading column. After the air is removed from the organic material, the valve will open to allow the organic material to pass into the disaggregator 400. Smoke exhaust from the thermal propeller 200 flows into the loading column 300 through smoke exhaust 110.

In the disaggregator 400, the Archimedes' screw moves the organic material into fuser tubes to undergo the molecular disaggregation process and produce Syngas, Synoil, and/or Carbon. The fuser tubes are housed within a furnace that is heated by the thermal propeller 200. The fuser tubes may be made or formed, at least partially, of a metal alloy to promote the molecular disaggregation process. The fuser pipes may be integral or may be formed from a plurality of sections joined, for example, by ceramic fiber gaskets. In the disaggregator 400, carbon is separated from the liquid and gaseous hydrocarbons. The carbon exits the disaggregator 400 through port or exit 140.

The thermal propeller 200 has an automatic fuel loader that automatically loads, with flow modulation, the fuel for the operation of the thermal propeller. The fuel can be carbon produced by the system itself or it can be other material of organic nature. An Archimedes' screw moves the fuel into the thermal propeller 200, which produces and supplies thermal energy to the disaggregator 400, namely the fuser tubes, so the disaggregator 400 can carry out the molecular disaggregation process along with an ionization process.

A junction cube 600 is connected between thermal propeller 200 and the furnace of the disaggregator 400. The junction cube 600 also allows the entrance of the fumes from the thermal propeller. The junction cube 600 is formed by a chamber which is lined with refractory materials. When the refractory materials are constantly heated at a temperature between 1,200/1,400° C., they become a thermal flywheel, which enables total catalytic effect upon them. Fumes or smoke from the thermal propeller enter the junction cube through entrance 130 and are transported through the furnace 400 and then to the loading column through the smoke exhaust 110.

Gases exit the disaggregator and enter the condenser 500, which cools the gases that exit at high temperatures from the fuser tubes so that the condensation of Synoil can take place as well as the separation of the Syngas. The condenser is permeated by a chamber through which cold water runs, which cools the gases and causes the condensation of the Synoil. The flow of cold water may be used for the thermal exchange with the exiting gases so that the part that can be condensed (Synoil) will be cooled and flow to the bottom of the condenser towards the exit point.

Synoil exits through port or exit 150 and enters a storage tank. Syngas exits the system at port 160 and is pumped into a storage tank.

Figure 2:
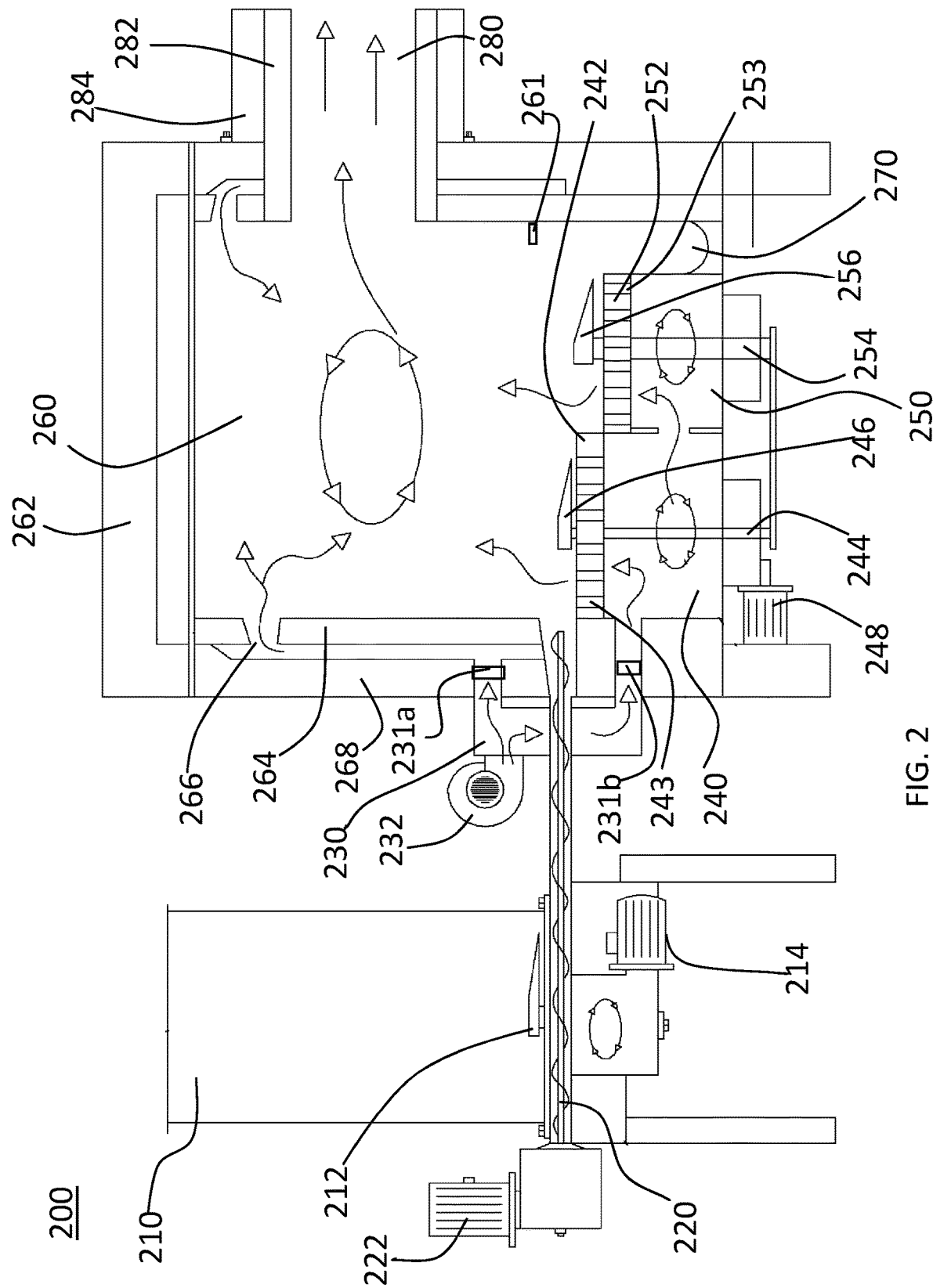
FIG. 2 is a diagram of an example thermal propeller in accordance with an embodiment of the present invention.

An example thermal propeller of the present disclosure is described with reference to FIG. 2. The thermal propeller has a loader and a body. The loader has fuel tank 210 that has an agitator 212 within it and motor 214 for moving the agitator 212, an Archimedes screw 220 and a motor 222 for rotating the Archimedes screw 220. The Archimedes screw 220 moves solid fuel such as carbon, wood chips, municipal solid waste, agricultural waste, medical waste, sludges, etc. (i.e., generally organic materials having around 25% moisture or less), into the body of the thermal propeller 200. The thermal propeller body has two lower chambers 240, 250 and a pyrolysis and combustion (gas oxidation) chamber 260 having catalytic walls. The lower chamber 240 is under primary fuser slab 242 and is connected to lower chamber 250, which is under secondary fuser slab 252. The fuser slabs 242, 252 have very heavy mass and heats up to a temperature between 350/450° C. At these temps, the fuel material on the fuser slabs is disaggregated to produce synthesis gas.

The fuel enters the thermal propeller 200 at a stoichiometric air carburetor 230, which has a turbine driven fan 232. The carburetor 230 is connected to lower chamber 240 and combustion chamber 260. The carburetor 230 is supplied with valves 231a, 231b which measure out/choke the flow of air into the chambers 240, 260. The measuring out of air is meticulous as the air which will flow under the primary fuser slab 252 will be, at any rate, much less than the total oxidation gases that exit the holes 266 that are placed above, high up inside the combustion chamber 260. In order to obtain a proper stoichiometry, the air regulation takes place by means of an oxygen sensor/detector 261 placed inside the combustion chamber 260 and by means of an on-board computer which establishes the movement of the air choke valve. Combustion preferably operates at temperatures of 1,200-1,500° C. in perfect stoichiometry. To initiate combustion in the thermal propeller, an initial amount of material, for example 5 kg, is placed on the primary fuser slab or plate 242, and a combustible material such as cotton soaked in gasoline is placed onto the primary fuser slab. The fan 232 is then started and once ignition is achieve additional material is added via the loader. Other methods of initiating combustion, of course, may be used with the present invention.

The turbine driven fan 232 supplies stoichiometric conditioned air through the carburetor 230 with a perfect stoichiometric ratio value for carburation of synthesis gases produced by the molecular disaggregation or pyrolysis process which takes place once the fuel is deposited on the fuser slabs 242, 252. As can be seen in FIG. 2, the measured out air coming out of the carburetor 230 will flow into the chamber 240 under the primary fuser slab 242, which has apertures or little holes 243 that allow the exit of the air under the fuel. It permits the creation of gases in partial oxygen deficiency.

A motor 248 is coupled to a pair of shafts 244, 254 by way of a transmission chain to cause the shafts 244, 254 to rotate simultaneously. The shaft 244 extends through the primary fuser slab 242 and is connected to an agitator 246. The shaft 254 extends through secondary fuser slab 252, which has holes 253 and is connected to agitator 256.

Solid fuel (carbon, wood chips, etc.) is moved onto the primary fuser slab 242 in the pyrolysis and combustion chamber 260 with Archimedes screw 220. The agitator 246 mixes the fuel on the primary fuser slab to ensure a better exposure of the material to the heat which disaggregates the fuel and also moves partially processed fuel onto the secondary fuser slab. The agitator 256 mixes the partially processed fuel on the secondary fuser slab and provides automatic unloading of the final inorganic ash into pit 270, from which the ash can be removed to a collection bucket located outside the thermal propeller 200.

The pyrolysis and combustion chamber 260 has fuser walls 264, a lid 262 and insulation refractory materials/stones 268 outside the fuser walls 264. The fuser walls 264 are made of refractory material, for example, a mix of two or more of alumina, silicon, carbide and corundum, etc., and operate at a temperature up to 1,500° C. to irradiate the material which lays on or is otherwise positioned about the fuser slabs 242, 252. The refractory materials are used to ensure thermal insulation and are made from various metal oxide powders, which give a high level of elasticity in the heating phase and high heat resistance at temperatures peaking at 2,400° C. The four fuser walls 264, i.e., the four sides of the chamber, can be easily substituted by removing the lid 262. The lid 262 is removed when extraordinary maintenance is needed. Once the lid 262 is removed, the inside of the pyrolysis and combustion chamber will be accessible for maintenance work.

The fuser walls 264 have holes 266 for the entrance of the stoichiometric air from the carburetor 230. The air that moves behind the primary refractory walls 264 and enters pyrolysis and combustion chamber 260 through the holes 266. When the gases are oxidized, they create a whirl which will characterize the flame seen flowing inside the furnace to heat the fuser tubes.

The hot post-combustion gases exit the thermal propeller 200 through a nozzle 280 that has a heat resistant material 282 forming the opening in the nozzle 280 and an insulating material 284 surrounding the heat resistant material 282.

Figure 3:
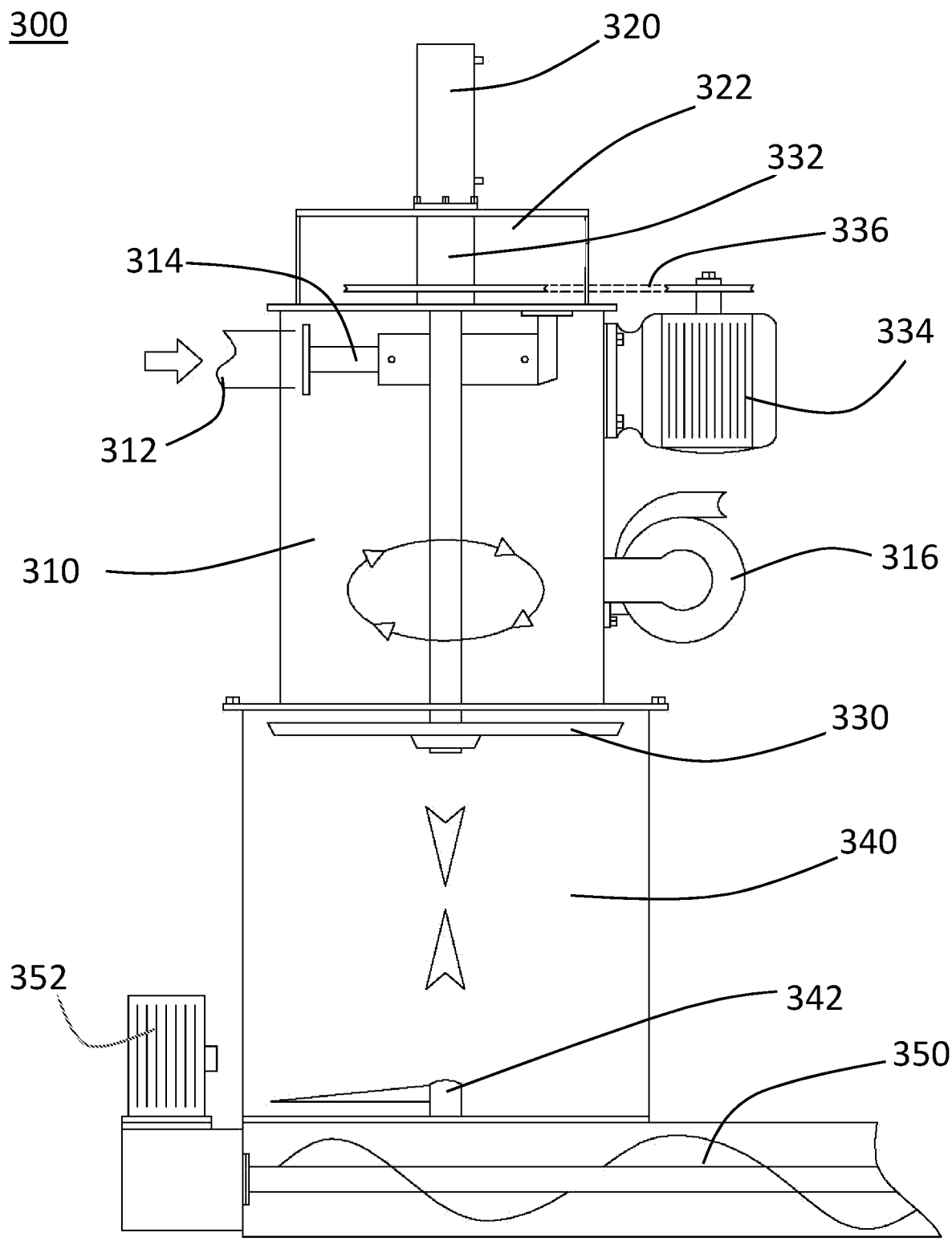
FIG. 3 is a diagram of an exemplary loading column in accordance with an embodiment of the invention.

An example loading column in accordance with an embodiment of the disclosure is described with reference to FIG. 3. The loading column 300 has a primary tank 310 and a secondary tank 340. There is a material inlet opening 312 in the primary tank 310 through which material such as rubber, plastic, or sticky materials enters the primary tank 310. A pneumatic piston/valve 314 closes the material inlet opening 312 in an airtight manner once the primary tank 310 becomes full. The closing of the inlet 312 opening enables the creation of negative pressure inside the primary tank 310 by means of a turbine 316.

The loading column 300 has a pneumatic piston 320 held in position by a bridge 322. The bridge 322 provides sufficient space to permit the piston 320 to ascend and descend. The pneumatic piston 320 is connected to a vertical sliding and rotating shaft 332 that is connected to an unloading valve 330. Decent of the piston 320 opens the valve 330. Ascent of the piston 320 closes the valve 330. The piston 320 rotates and is driven by electric motor 334, which is connected to the piston by a transmission pulley such as a rubber belt 366. As a result of the rotation of the piston, the shaft 332 and valve 330 rotate and generate a centrifugal effect that causes the solid material to be quickly unloaded into an underlying secondary tank 340. The valve 330 provide for airtight closing of the secondary tank 340 once the loading is completed.

With the valve 330 closed in an airtight manner, material is loaded into the primary tank via the entry point 312. Once the loading of material into the primary tank 310 is completed, the piston/valve 314 closes the entry point 312 in an airtight manner. A turbine 316 connected to the primary tank creates negative pressure inside the primary tank 310 to remove air from the organic material.

Beneath the secondary tank 340 a gear motor 352 drives an Archimedes' screw 350 to move the material from the loading column 300 into the pyrodisaggregator 400. The electric motor 352 is regulated by an inverter), which determines the most suitable speed of operation on the basis of the type of material which needs to be moved.

An agitator/stirrer 342 located at the bottom of the secondary tank 340 is driven by another gear motor to move the material so as to make it fall easily into the Archimedes' screw 350.

The Archimedes' screw 350, which moves the material into the disaggregator, is formed by spiral shaped sectors which rotate a full 360°. The spirals are detached one from the other but they are welded onto the drive shaft. This structure makes it so the drive shaft of the Archimedes' screw does not deform/warp when it operates at high temperatures.

Figure 4:
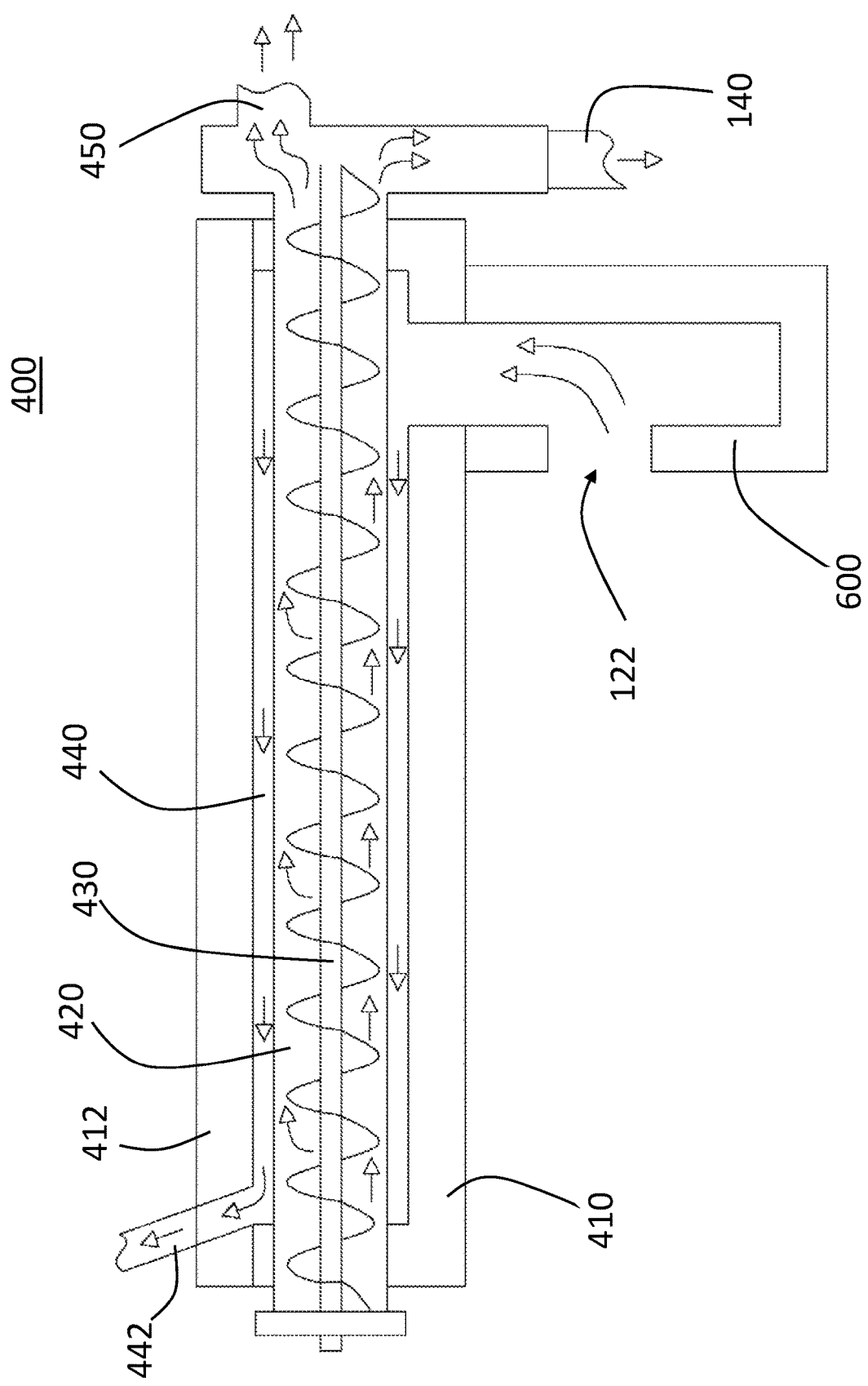
FIG. 4 is a diagram of an exemplary pyrodisaggregator in accordance with an embodiment of the present invention.

An example embodiment of the molecular pyrodisaggregator 400 is described with reference to FIG. 4. The molecular pyrodisaggregator 400 has a furnace 410 connected to the junction cube 600. The furnace 410 has one or more fuser tubes 420 within it. The fuser tubes or pipes 420 are formed from a metal alloy that emits high quantities of ions within the fuser tubes during the pyrolysis process. The number of fuser tubes 420 may vary depending on the size of the plant.

An Archimedes' screw 430 is positioned in the fuser tube 420 for moving materials inside the fuser tube 420 needing to be processed downstream. During assembly, a furnace lid 412 is placed on the furnace 410 after the fuser tubes have been placed inside the furnace. A ceramic gasket may be used as a seal between the lid 412 and the furnace walls. Chamber or space 440 between the fuser tubes and the furnace wall allow hot fumes from the thermal propeller 200 to circulate/rotate around the fuser tubes 420. The hot fumes from the thermal propeller 200 enter the space 440 through entrance 122. An exit 442 for the fumes that have been used to heat the fuser tubes is provided. A plurality of automatic extractors may be provided to remove dust produced by the thermal propeller 200 from the furnace 400.

Materials within the furnace 420 are moved by the Archimedes screw 430 toward exit 140 for carbon-metals-inert materials and exit 450 for gases. The fuser pipes are heated by a heat source (the thermal propeller in some embodiments) which generates heat by combustion. The molecular disaggregation process begins when the fuser tubes reach a temperature of about 200° C. and ends once the organic material, having reached a temperature of about 350° C., sublimates completely and reaches the ends of the fuser tubes in a solid (carbon) and hydro gaseous (Synoil and Syngas) form. The solid materials exiting through exit 140 are moved toward a separator which separates the various products into separate containers. Prior to moving into the separator, the solid materials may be conveyed to an airtight heat exchanger to undergo a cooling process to prevent spontaneous combustion at high temperatures due to the presence of oxygen. The solid materials may be used as fuel for the thermal propeller 200 or other industrial purposes. The gases exiting through exit 450 proceed to the condenser 500 for cooling. Example organic materials that may be used as feedstock for an embodiment of the pyrodisaggregator include plastics, tires, certain woods, agricultural waste (e.g. coconut shells), bamboo and other organic materials known to those skilled in the art to disaggregate into outputs such as syngas, synoil and carbon black.

Figure 5:
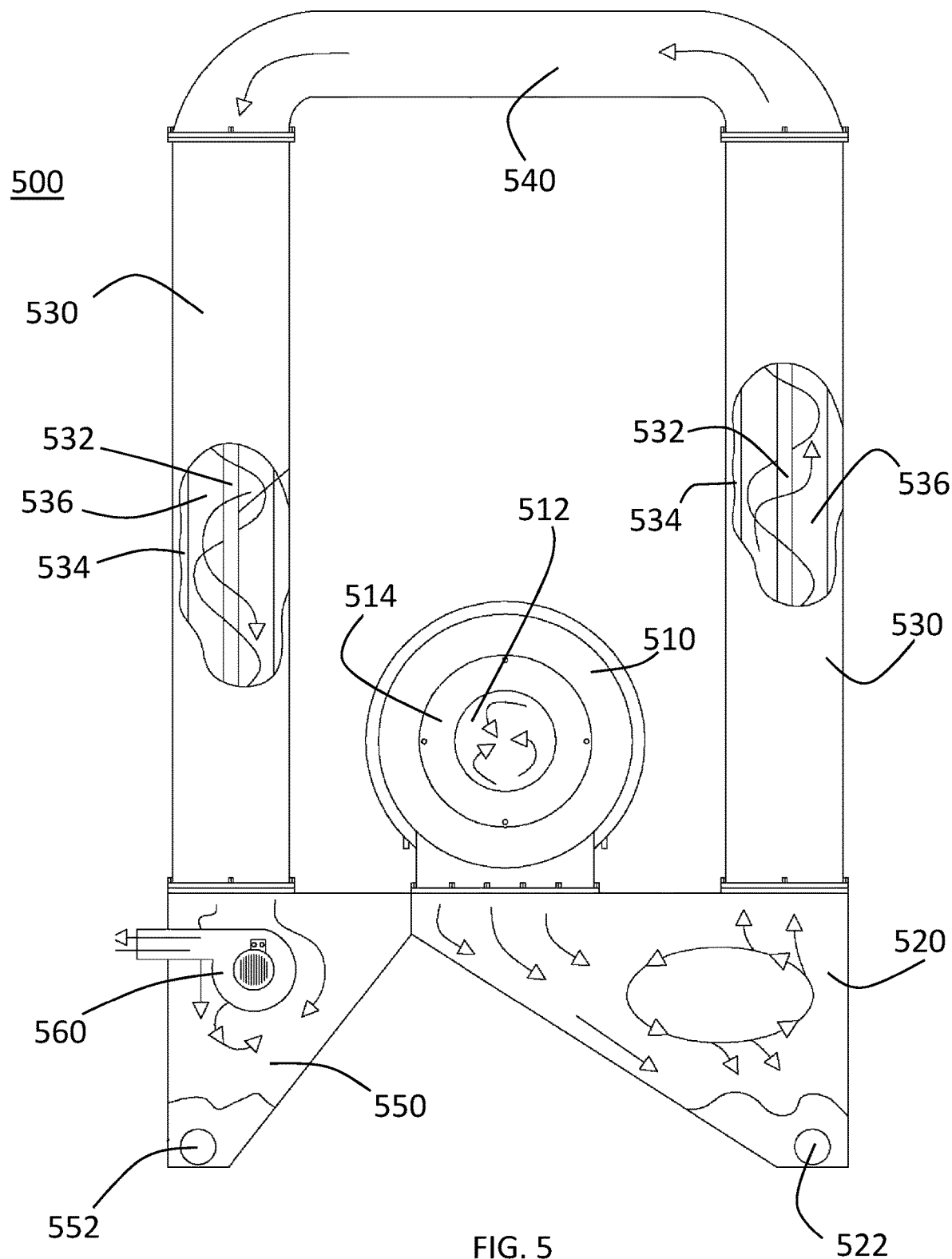
FIG. 5 is a diagram of an exemplary condenser in accordance with an embodiment of the present invention.

An example embodiment of the condenser 500 is described with reference to FIG. 5. The condenser 500 has an entrance dome 512 through which gases from the molecular pyrodisaggregator 400 enter the condenser 500. The entry point is covered by a cold water chamber 510. Connection flange 514 between the chamber 510 and the molecular pyrodisaggregator 400 are connected by means of an insulated pipe.

The gases reaching the condenser are hot (300-400° C.) and so the hydrocarbons (oil of synthesis) are still in gaseous form. The condenser 500 needs to cool the gases and enable the condensation of the oil of synthesis (it becomes liquid). The circular entrance dome 512 is covered by a cold water chamber 510. By means of a hydraulic pump, the water circulates into all of the cooling circuit. As the oil condenses, it falls into the hopper 520 while the Syngas, which cannot be condensed, h continues its advance to the columns 530. After passing through the columns 530, the syngas is suctioned by turbine/aspirator 560 to be moved into Syngas collection tanks and light hydrocarbons are collected in hopper 550.

The cooling circuit has a pair of columns 530 connected by a connection manifold 540. The columns 530 each have a channel 536 that allows the gases to move along a long and cooled path and in doing so they lose all the liquid part which unloads into the hoppers 520, 550. An air-lock spacer 534 is inside the column 530 where the water which cools the Syngas circulates. Spirals, cochlea or other batting 532 inside the columns 530 slow down the flow of the Syngas. This allows the gases to cool down properly by reaching room temperature. When this happens, all the condensable portions will have already been condensed and the various kinds of Syngas will be dry and clean.

The main hopper 520 collects the vast majority of the oil which has condensed. It also refines the condensing process by moving the gas into the column. Suction/aspiration point 522 is provided for the oil of synthesis. The oil is suctioned by means of a pump and sent to a collection tank. Secondary hopper 550 collects the light hydrocarbons which move along with the Syngas, as they are lighter than the oils in the primary hopper 520. Suction/aspiration point 552 is provided for suction of light hydrocarbons by means of a pump. They then are sent to a collection tank. Turbine/aspirator 560 moves the Syngas, cleaned from any oil and thus dry, into a storage tank, where it is ready to be used for all intended purposes.

Figure 6:
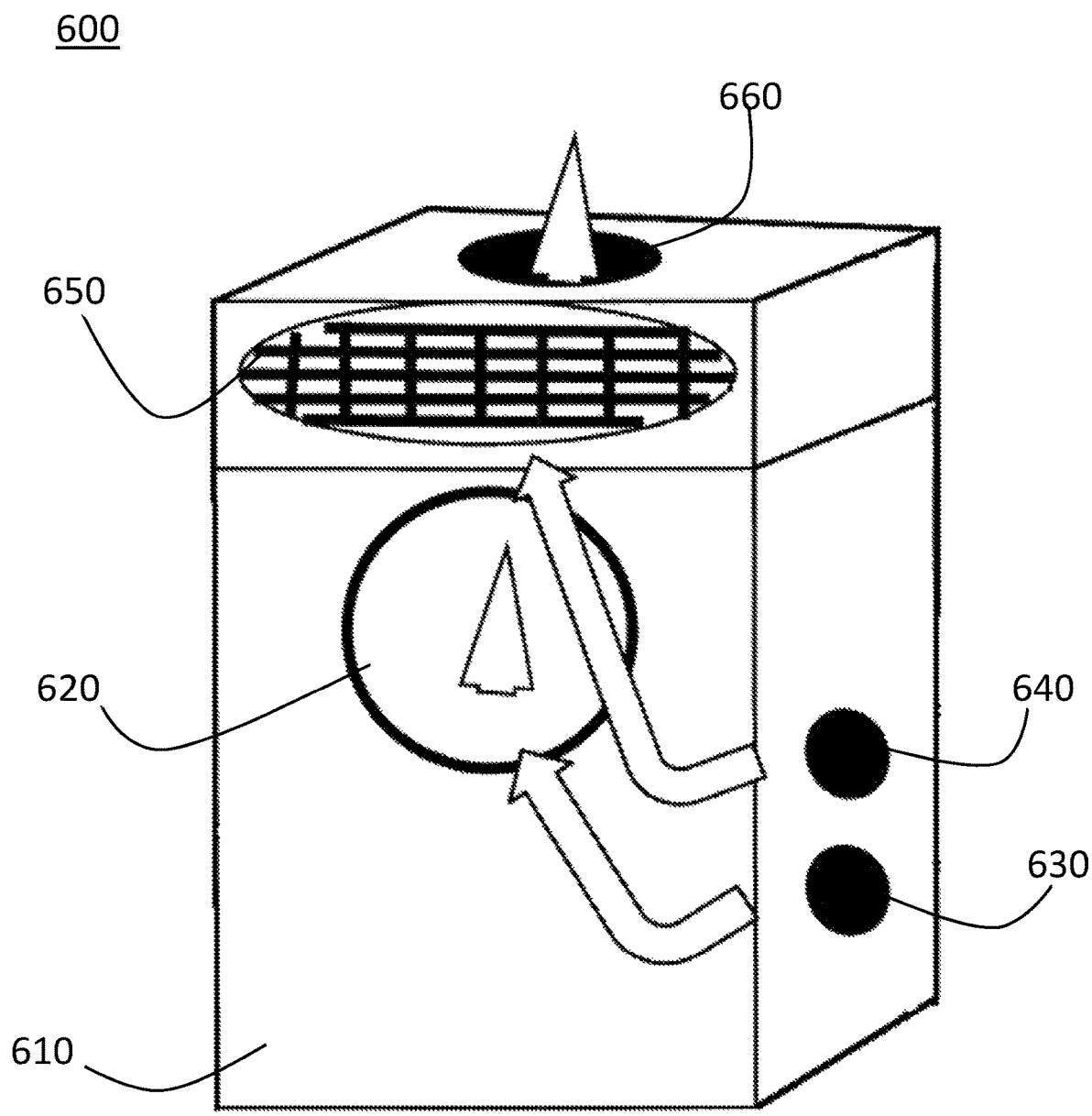
FIG. 6 is a diagram of an exemplary titanium/platinum ion catalyst junction cube in accordance with an embodiment of the present invention.

A titanium/platinum ion catalyst junction cube 600, or "C.I.T. Cube," in accordance with an embodiment of the present disclosure is described with referenced to FIG. 6. The C.I.T. Cube uses composition materials $TiO_6$, $TiO_2$ and $PTO_2$ mixed in $Al_2O_3$ to transform or eliminate harmful exhaust gas generated by endothermic engines. The C.I.T. Cube treats toxic-noxious exhaust gas emanating from endothermic engines or by industrial processes and in an embodiment emits only $H_2$, $CO_2$ and $H_2O$.

The C.I.T. Cube is a parallelepiped that generally is inserted between a thermal propeller (that regardless the type of fuel that is used produces heat above 1000° C.), and a heat exchanger. The heat produced before going to the thermal exchange (be it air/water, steam, diathermic oil heat exchanger or a cooking furnace or a dryer etc.) accumulates in a labyrinth made of refractory bars made with types of metals in the form of oxides such as $TiO_6$ (titanium hexaoxide), $TiO_2$ (titanium dioxide), $PtO_2$ (platinum dioxide). Photons produced by the thermal propeller's flame stimulate the catalytic effect of titanium oxides and platinum dioxide obtaining the result of hexaoxidate CO and all benzenes with pertinent aromatic chains, obtaining $CO_2$. Therefore smokes produced by polluting combustion engines will be introduced in the C.I.T. Cube and will be molecularly disaggregated and brought back in stoichiometry in order to be subsequently processed through the described metal oxides. The result will be that the emissions into atmosphere will be formed almost only by $N_2$, $CO_2$ and $H_2O$. Other gaseous flows can likewise be inserted in the C.I.T. Cube to be disaggregated and purified, as well as powders, even ultra-fine toxic ones, and toxic liquid with their dosing device, etc.

The C.I.T. Cube 600 has a housing 610 formed of metal sheets and internally insulated with isolating refractory materials. The C.I.T. Cube is connected to a thermal propeller at entry or port 620. Smoke or exhaust generated by an endothermic engine or an exhaust with other polluting elements as above described enters the C.I.T. Cube through entry or port 630. A second entry or port 640 is provided for smoke/exhaust generated by another endothermic engine or for other polluting elements as above described. A plurality of titanium/platinum ion boards 650 are positioned with the C.I.T. Cube 600. The titanium/platinum boards 650 act as the catalyst. Exit point 660 is provided for processed smoke that will proceed toward the heat exchanger.

An embodiment of a hydraulic net filter in accordance with the present disclosure will be described with reference to FIG. 7. The hydraulic disc filter is used to clean/purify the flue/exhaust emissions of boilers/heaters and furnaces, and also for the purification of gas of synthesis, ambient air, etc. For example, the hydraulic net filter could be connected to Syngas exit 160 in FIG. 1. The filter 700 has a plurality of rotating discs 722 that create centrifugal force. If water or oil is poured on the rotating discs, while the discs 722 rotate at a variable speed, the liquid will create a circular net in which the flue/exhaust gas, as they pass through the net, will be purified from all the particulate which travels alongside of them, and also from all the acid molecules such as HCL, $H_2SO_4$, etc. The particulate will be consequently captured as mud/sludge, in a designated receptacle/site, while the acids will be neutralized with basic powders or electrolytic equipment.

Figure 7:
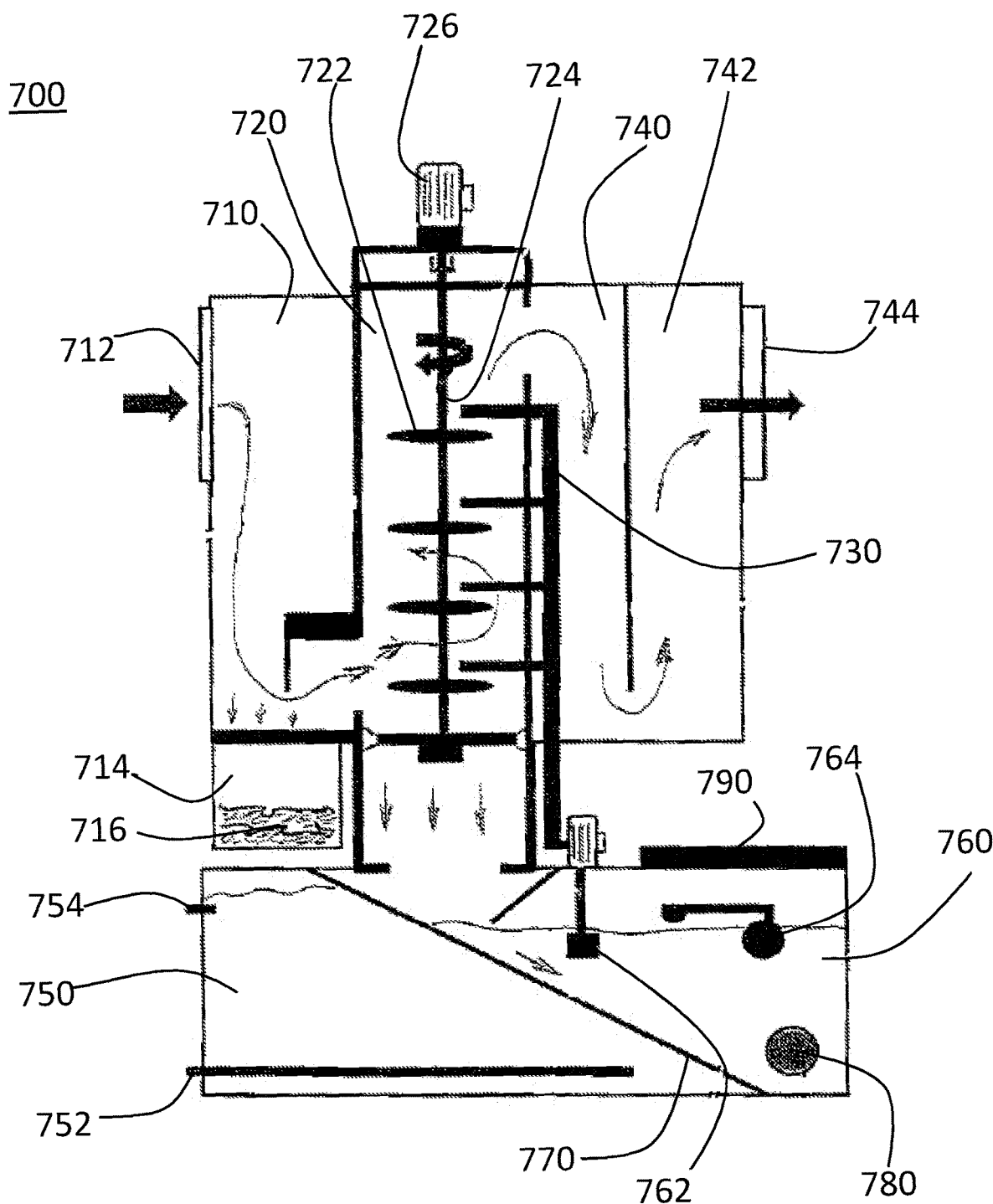
FIG. 7 is a diagram of an exemplary hydraulic net filter in accordance with an embodiment of the present invention.

In an example embodiment shown in FIG. 7, the hydraulic net filter 700 of the present disclosure has a metallic tower 720 that rests on a tank 760 which contains, depending on the required needs, either water or oil. The tower 720 is connected to a series of compartments, compartment 710 on the side from which the air flow enters the tower 720 and compartments 730, 740 on the side from which the air flow exits the tower 720. The tower 720 contains a rotating shaft 724 with discs 722. The flue or exhaust gas (referred to herein as "gas flow") needing purification accesses the hydraulic net filter 700 through port or entrance 712 in compartment 710 and completes a 180° revolution, i.e., it travels from the port 712 near the top of the compartment 710 down to the bottom of the compartment 710 to a port or opening between the compartment 710 and the tower 720. Through this maneuver it loses the great majority of dry particulate, which drops into the compartment or drawer 714 from which it is periodically removed. Next, as the gas flow enters the lower portion of the tower 720 it will flow up into the disc area of the tower 720. In the tower 720, a hydraulic pump 762 pumps water/oil through a manifold 730 directly onto the discs 722. A motor 726 connected to the shaft 724 rotates the shaft 724, and hence the discs 722, thereby generating a centrifugal effect. Because of the centrifugal effect, the discs 722 will create a hydraulic net which will hit the walls of the tower. The hydraulic filters formed by the centrifuge created by the discs will travel at a speed which will vary around 70/100 ml per second. This way no particle moved by the gas flow (regardless of its speed) will be able to escape capture by the hydraulic net.

The particulate and the hydraulic liquid from the tower 720 will fall in the tank 760 underneath the tower 720 where the liquid will decant the particulate into the compartment 780 from which it will later be removed, whether manually or automatically. Separated from the tank 760 by a diagonal wall 770 is a cooling liquid basin 750, which has an entry way 752 and an exit 754. The cooling liquid basin has a cooling liquid in the event that the gas flow, which is hot, may cause excess evaporation of process water. The process liquid (water/oil), which is stored in stocking tank 760 and flows up the manifold 730 does not need to be substituted as only the mud/sludge will be removed. The tank 760 has a float 764 for the automatic topping up/refilling of the process liquid to compensate for the water evaporation. The tank 760 has an inspection door or lid 790 for inspecting or performing maintenance on the tank 760 or any of the components within it. The inspection door 790 also may be used to load basic powders used to regulate the PH of the process liquid.

The gas flow, after traveling up the metallic depuration tower 720 flows into and through compartment 730 and then into and through compartment 740, from which it exits the filter 700 at exit 742, after having left behind in the circuit through compartments 730, 740 possible residual process liquid drops. The gas flow then will be released, either in the atmosphere—when it is flue/exhaust gas, or in a stocking chamber—when it is technical or fuel gas.

With the above-described system, a hydraulic network by means of centrifugal wheels/discs: water streams, traveling up to and beyond the speed of 100 linear meters per second, comprise the network. This creates a system that is able to capture micro and nano dust particles which are removed/conveyed by gas flows, such as exhaust/flue/combustion gasses, or any other gasses. Moreover, this net can capture acid molecules in real time before it even falls into the basin. This system can operate using liquids which will rarely, if ever, need to be changed. The mud/sludge can be removed without draining or substituting the processing liquid. The system can be used to cleanse/purify highly flammable gas flows. Additionally, the system carries out its process in a closed circuit. Still further, the system can perform with little electrical usage as there are only two small motors that need to be powered.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiment was chosen and described in order to explain the principles of the disclosure and its practical application to enable one skilled in the art to utilize the disclosure in various embodiments as are suited to the particular use contemplated. It is intended that the scope of the disclosure be defined by the claims appended hereto, and their equivalents. The entirety of each of the aforementioned documents is incorporated by reference herein.

What is claimed is:

1. A molecular pyrodisaggregation system comprising:
    a pyrodisaggregator, said pyrodisaggregator comprising:
        a furnace, said furnace having a furnace chamber;
        a fuser tube within said furnace chamber, said fuser tube comprising a metal alloy and having an entrance at a first end of said fuser tube;
        an Archimedes screw within said fuser tube for moving material to be disaggregated through said fuser tube;
        a first furnace exit at a second end of said fuser tube for inert materials to exit said fuser tube;
        a second furnace exit at said second end of said fuser tube for gases to exit said fuser tube; and
        a third furnace exit for fumes circulating through said furnace chamber;
    a loading column connected to said pyrodisaggregator for loading materials to be disaggregated into said entrance at said first end of said fuser tube;
    a thermal propeller connected to said furnace chamber; and
    a condenser connected to said second exit, wherein said condenser comprises:
        an entry dome connected to said second exit from said furnace for receiving gases from said pyrodisaggregator;
        a cold water chamber surrounding said entrance dome for cooling said gases received from said pyrodisaggregator;
        a primary hopper connected to said entrance dome for collecting oil condensed out of said gases received from said pyrodisaggregator;
        first and second vertical condenser columns for proving a cooled path for gas flowing into said condenser columns, each condenser column comprising:
            an air lock space for water used to cool gases within said channel;
        a connection manifold connecting said first condenser column to said second condenser column, wherein gas from said entry dome flows into and through said first condenser column then through said connection manifold and then through said second condenser column;
        a secondary hopper connected to said second condenser column for receiving light hydrocarbons from said second condenser column; and
        an aspirator for moving syngas from said con denser into a storage tank;
    wherein said thermal propeller, said furnace and said third furnace exit are arranged to cause hot fumes from said thermal propeller to circulate in said furnace chamber around said fuser tube and flow in a direction from said second end of said fuser tube toward said first end of said fuser tube.

2. A molecular pyrodisaggregation system according to claim 1, wherein said condenser further comprises:
    a plurality of spirals within said channel in at least one of said first and second condenser columns for slowing a flow of gases within said condenser column.

3. A molecular pyrodisaggregation system comprising:
    a pyrodisaggregator, said pyrodisaggregator comprising:
    a furnace, said furnace having a chamber;
    a fuser tube within said furnace chamber, said fuser tube comprising a metal alloy and having an entrance at a first end of said fuser tube;
    an Archimedes screw within said fuser tube for moving material to be disaggregated through said fuser tube;
    a first exit at a second end of said fuser tube for inert materials to exit said fuser tube;
    a second furnace exit at said second end of said fuser tube for gases to exit said fuser tube; and a third furnace exit for fumes circulating through said furnace chamber;
a loading column connected to said pyrodisaggregator for loading materials to be disaggregated into said entrance at said first end of said fuser tube,
a thermal propeller connected to said, furnace chamber wherein said thermal propeller comprises:
a combustion and pyrolysis chamber formed by:
  at least one side wall comprising a refractory material, wherein said refractory material comprises at least two selected from the group of alumina, silicon, carbide and corundum;
  a primary fuser slab and a secondary fuser slab forming a bottom of said combustion and pyrolysis chamber, said primary fuser slab positioned to receive solid fuel from a fuel tank and said secondary fuser slab positioned to receive solid fuel from said primary fuser slab; and
  a lid for closing said combustion and pyrolysis chamber;
a condenser connected to said second furnace exit; and
a nozzle through which hot post-combustion gases exit the combustion and pyrolysis chamber and enter said furnace chamber around said fuser tube;
wherein said thermal propeller, said furnace and said third furnace exit are arranged to cause hot furnace from said thermal propeller to circulate in said furnace chamber around said fuser tube and flow in a direction from said second end of said fuser tube toward said first end of said fuser tube.

4. A molecular pyrodisaggregation system according to claim 3, wherein said thermal propeller further comprises:
a first agitator assembly for moving solid fuel on said primary fuser slab, said first agitator assembly comprising a first agitator on top of said primary fuser slab, a shaft connected to said first agitator and extending through said primary fuser slab and a motor connected to said shaft for driving said agitator; and
a second agitator for moving solid fuel on said secondary fuser slab.

5. A molecular pyrodisaggregation system according to claim 3, wherein said thermal propeller further comprises:
a stoichiometric air carburetor connected to said combustion and pyrolysis chamber, wherein said stoichiometric air carburetor a comprises a valve for controlling a flow of air into said combustion and pyrolysis chamber; and
a first lower chamber beneath said primary fuser slab, wherein a plurality of air holes extend through said primary fuser slab, wherein said stoichiometric air carburetor is connected to said first lower chamber.

6. A molecular pyrodisaggregation system according to claim 5, wherein a stoichiometric air carburetor has an exit into said combustion and pyrolysis chamber in an upper portion of said combustion and pyrolysis chamber.

7. A molecular pyrodisaggregation system according to claim 5, wherein said thermal propeller further comprises:
a turbine driven fan connected to said stoichiometric air carburetor.

8. A molecular pyrodisaggregation system according to claim 5, wherein said thermal propeller further comprises:
an ash downloading exit.

9. A molecular pyrodisaggregation system according to claim 5, wherein said thermal propeller comprises:
a second lower chamber beneath said secondary fuser slab, wherein a plurality of air holes extend through said secondary fuser slab, wherein said second lower chamber is connected to said first lower chamber.

10. A molecular pyrodisaggregation system comprising:
a pyrodisaggregator, said pyrodisaggregator comprising:
  a furnace;
  a fuser tube within said furnace, said fuser tube comprising a metal alloy and having an entrance at a first end of said fuser tube;
  a channel within said furnace surrounding said fuser tube;
  an Archimedes screw within said fuser tube for moving material to be disaggregated through said fuser tube;
  a first exit at a second end of said fuser tube for inert materials to exit said fuser tube;
  a second exit at said second end of said fuser tube for gases to exit said fuser tube; and
  a third exit for fumes circulating through said channel to exit said furnace;
a loader connected to said pyrodisaggregator for loading materials to be disaggregated into said first end of said fuser tube;
a source of hot fumes connected to said channel in said furnace, wherein said source of hot fumes, said furnace and said third furnace exit are arranged to cause hot fumes from said source of hot fumes to circulate in said channel of said furnace around said fuser tube and to flow in a direction from said first end of said fuser tube toward said second end of said fuser tube; and
a condenser connected to said second exit, wherein said condenser comprises:
  an entrance structure connected to said second exit from said furnace for receiving gases from said pyrodisaggregator;
  a cold water chamber surrounding said entrance structure for cooling said gases received from said pyrodisaggregator;
  first and second condenser columns each for providing a cooled path for gas flowing into said condenser columns, each condenser column comprising:
    a batting within said each condenser column for slowing a flow of gas within said condenser column;
    an air lock space within each said condenser columns for circulating water used to cool gas;
  a connection manifold connecting said first condenser column to said second condenser column, wherein gas from said entry structure flows into and through said first condenser column then through said connection manifold and then through said second condenser column;
  a primary hopper connected to said entrance structure and said first condenser column for collecting oil condensed out of said gases received from said pyrodisaggregator;
  a secondary hopper connected to said second condenser column for receiving light hydrocarbons from said second condenser column.

11. A molecular pyrodisaggregation system according to claim 10, wherein said condenser further comprises:
an aspirator for moving syngas from said condenser into a storage tank.

12. A molecular pyrodisaggregation system according to claim 10, wherein said entry structure comprises a dome.

13. A molecular pyrodisaggregation system according to claim 10, wherein said batting comprises a plurality of spirals.

14. A molecular pyrodisaggregation system comprising:
a pyrodisaggregator, said pyrodisaggregator comprising:

a furnace, said furnace having a chamber;
a fuser tube within said furnace chamber, said fuser tube comprising a metal alloy;
an Archimedes screw within said fuser tube for moving material to be disaggregated through said fuser tube;
a first furnace exit for inert materials from said fuser tube;
a second furnace exit for gases from said fuser tube; and
a third furnace exit for fumes circulating through said furnace chamber; wherein
said fuser tube is connected to said first exit and said second exit;
a loading column connected to said pyrodisaggregator for loading materials to be disaggregated into said fuser tube in said furnace;
a thermal propeller connected to said furnace, wherein hot fumes from said thermal propeller circulate in said furnace chamber said fuser tube; and
a condenser connected to said second exit, wherein said condenser comprises:
   an entry dome connected to said second exit from said furnace for receiving gases from said pyrodisaggregator;
   a cold water chamber surrounding said entrance dome for cooling said gases received from said pyrodisaggregator;
   a primary hopper connected to said entrance dome for collecting oil condensed out of said gases received from said pyrodisaggregator;
   first and second vertical condenser columns for proving a cooled path for gas flowing into said condenser columns, each condenser column comprising:
   a channel through which gases flow; and
   an air lock space for water used to cool gases within said channel:
   a connection manifold connecting said first condenser column to said second condenser column, wherein gas from said entry dome flows into and through said first condenser column then through said connection manifold and then through said second condenser column;
   a secondary hopper connected to said second condenser column for receiving light hydrocarbons from said second condenser column; and
wherein said thermal propeller comprises:
a combustion and pyrolysis chamber formed by:
   at least one catalytic side wall comprising a refractory material, wherein said refractory material comprises at least two selected from the group of alumina, silicon, carbide and corundum;
   a primary fuser slab and a secondary fuser slab forming a bottom of said combustion and pyrolysis chamber, said primary fuser slab positioned to receive solid fuel from a fuel tank and said secondary fuser slab positioned to receive solid fuel from said primary fuser slab; and
   a lid for closing said combustion and pyrolysis chamber;
a first lower chamber beneath said primary fuser slab;
a second lower chamber beneath said secondary fuser slab; and
a stoichiometric air carburetor connected to said combustion and pyrolysis chamber and said first lower chamber, wherein said stoichiometric air carburetor comprises a plurality of valves for controlling a flow of air into said combustion and pyrolysis chamber and into said first lower chamber.

15. A molecular pyrodisaggregation system according to claim 14, further comprising an oxygen sensor in said combustion and pyrolysis chamber;
wherein said system controls a stoichiometry in said combustion and pyrolysis chamber and said first lower chamber in response to an output from said oxygen sensor.

* * * * *